Feb. 3, 1931.  H. R. RICARDO  1,790,767
PACKING
Filed May 27, 1930   2 Sheets-Sheet 1

Feb. 3, 1931.        H. R. RICARDO        1,790,767
PACKING
Filed May 27, 1930    2 Sheets-Sheet 2

Inventor,
Harry Ralph Ricardo,
Per,
Watson, Coit, Morse & Grindle Attys.

Patented Feb. 3, 1931

1,790,767

UNITED STATES PATENT OFFICE

HARRY RALPH RICARDO, OF LONDON, ENGLAND

PACKING

Application filed May 27, 1930, Serial No. 456,236, and in Great Britain June 11, 1929.

This invention relates to fluid pressure engines, pumps or compressors of the reciprocating piston type wherein the escape of fluid from the working chamber of the engine between two relatively movable parts, for example between the piston and cylinder or, in the case of a sleeve valve engine having a plug-like cylinder head extending into the upper end of the sleeve, between the sleeve and cylinder head, is reduced or prevented by one or more sealing rings each disposed in a groove in one of such parts so as to be movable radially therein and engaging the other part. The invention is particularly but not exclusively applicable to internal combustion engines and high pressure air compressors.

In such engines and compressors when operating under heavy working conditions, trouble is often experienced owing to the accumulation of carbon behind the sealing ring or rings, particularly those lying adjacent to the working chamber, the annular space behind such rings eventually becoming completely filled with carbon which then "packs out" the rings and causes excessive wear to the parts engaged thereby and in some cases even seizure.

It would appear that this difficulty might be overcome by increasing the depth of the annular space behind the sealing ring or rings, but experience has shown that the increased flow of gas in and out of such space thus caused increases the rate of carbon formation to a practically corresponding extent so that little or no advantage is obtained.

According to the present invention a groove for a sealing ring for reducing or preventing escape of fluid between two relatively movable parts from the working chamber of a fluid pressure engine, pump or compressor of the above kind is formed of such depth in relation to the thickness of the sealing ring measured radially as to leave an annular recess behind the ring, and this recess has disposed within it one or more members, hereinafter termed axially movable members, capable of moving therein in a direction at right angles to the plane in which the sealing ring lies.

The invention may be applied to one or more sealing ring grooves in an axially movable member, such as a piston, or in an axially movable plug-like cylinder head or other member in which case movement of the axially movable members in the annular recess will be effected partly due to the inertia of such member or members when the piston or other part carrying them reciprocates, and partly to the flow of gas into and out of the groove. When, on the other hand, the invention is applied to one or more sealing ring grooves in a fixed member, such as a plug-like cylinder head which extends into the upper end of a sleeve valve in a sleeve valve engine, pump or compressor, movement of the axially movable member or members will be caused solely by the flow of gas into and out of the ring groove. In any case the axially movable member or members by their movement in the groove either under the influence of the gas flow into and out of the groove along or in combination with the reciprocating motion of the member carrying the ring or rings, act to break up any carbon which tends to collect behind the sealing ring into small pieces which can work their way out past the sealing ring.

The form of the axially movable member or members may vary. Conveniently, however, there is disposed in the annular recess behind each sealing ring a series of separate segmental members arranged end to end and each capable of moving in the recess in a direction at right angles to the plane in which the sealing ring lines. These segmental members conveniently have such radial thickness as to extend substantially from the inner to the outer circumferential wall of the annular recess but are of such axial width as to permit the axial movement thereof in such recess.

Alternatively a single split ring may be employed instead of the segments, this ring being so dimensioned and formed as not to press either against the inner circumference of the ring groove or against the inner circumferential surface of the sealing ring with a force sufficient to prevent the axial movement of the axially movable ring during the operation of the engine or compressor.

The invention may be carried into practice in various ways but two constructions according to this invention are illustrated by way of example in the accompanying drawings, in which Figure 1 is a side elevation partly in section showing the invention applied to a piston for a reciprocating engine or compressor.

Figure 1:
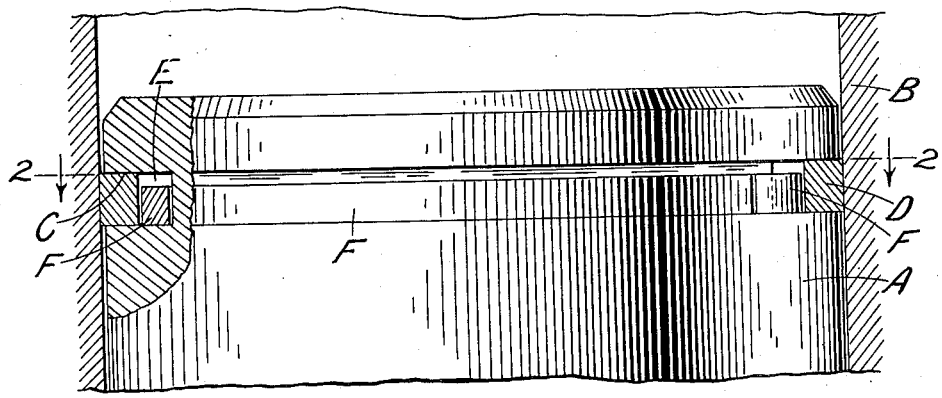
Figure 2:
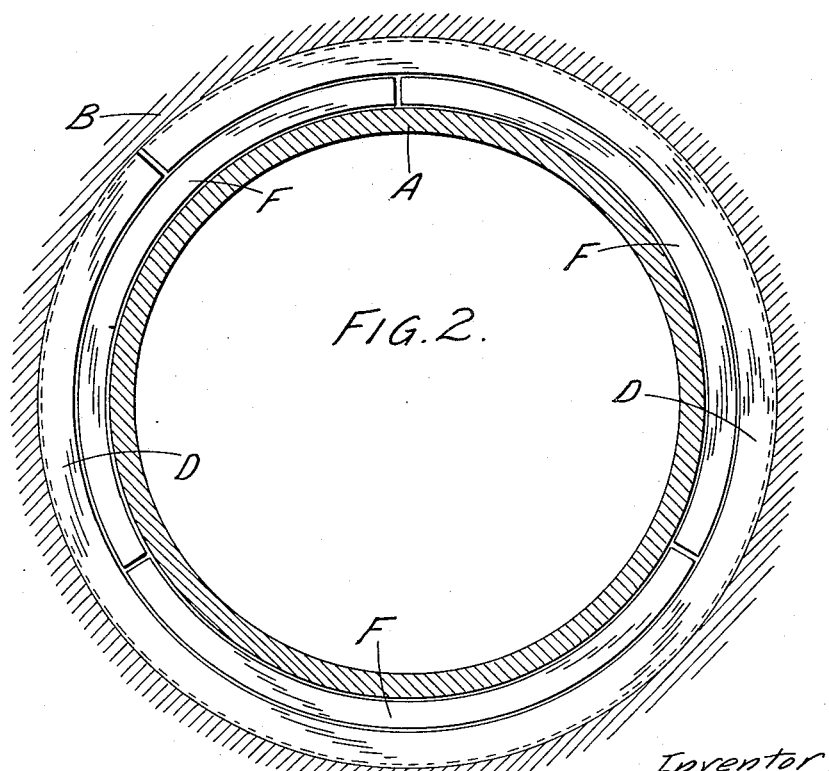
Figure 2 is a section on the line 2—2 of Figure 1.

In the construction illustrated in Figures 1 and 2, a piston A arranged within a cylinder, indicated at B, is provided with a piston ring groove C within which is mounted a sealing ring D of the known split type having the usual small clearance in a direction parallel to the piston axis to permit of free radial movement of the ring relatively to the piston but to prevent excessive flow of gas behind the ring. The radial depth of the groove C is such in relation to the radial thickness of the sealing ring D therein that as shown there is an annular recess E behind the ring D. In this recess E is disposed a series of separate segmental members F placed end to end as shown. In the construction illustrated three of such segmental members are provided. If desired however, some other number may be employed, these segmental members in any case extending substantially completely around the recess E. Alternatively, the segmental members F may be replaced by a single split ring.

The segmental members F are of such dimensions measured radially as to fill the annular space E as far as is practicable but have such width measured in a direction parallel to the piston axis as to permit to each of them a limited movement in the annular recess E in such axial direction under the action of inertia and gas pressure when the piston reciprocates. The clearance measured in the axial direction respectively of the sealing ring D and segmental members F may vary. In an internal combustion engine having a cylinder bore of 7.5 inches diameter, however, the sealing ring D may have for example an axial clearance of say 0.008 inches and the segmental ring F an axial clearance of say from 0.040 to 0.050 inches. Where a split axially movable ring is employed instead of the segmental members F, this ring must be of such internal and external diameter as not to grip the piston or the sealing ring D with sufficient force to prevent the axially movable ring from moving in a direction parallel to the piston axis under the action of inertia and gas pressure.

It will be seen that the movement of the segmental members F or the ring which may be employed instead of such segmental members, under the influence of the reciprocating motion of the piston will break up any carbon which tends to collect behind the sealing ring D into small pieces which can work their way out past the sealing ring D whereby the packing out of the sealing ring by carbon and the consequent hindrance to its proper operation is prevented.

Figure 3:
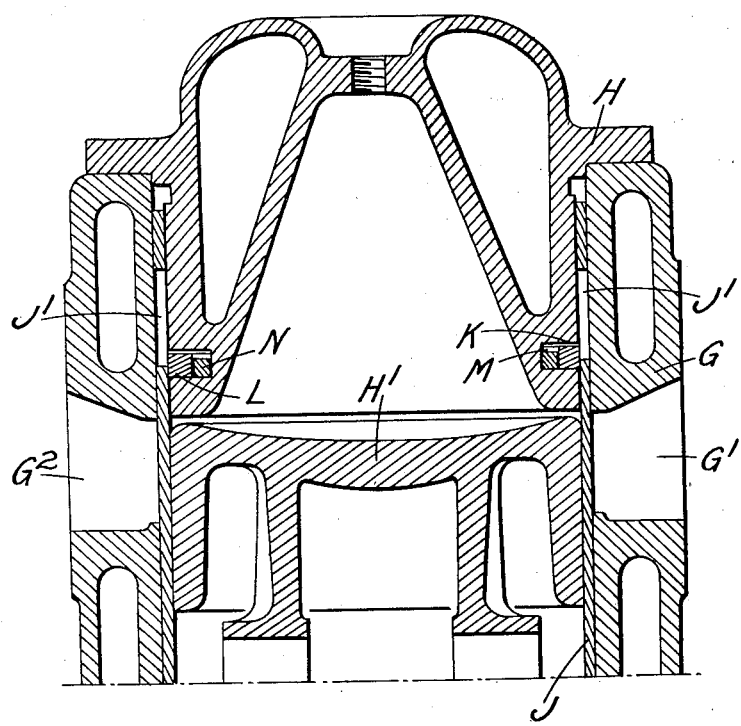
Figure 3 is a vertical section through the cylinder head and upper end of the cylinder of a sleeve valve engine to the cylinder head of which the present invention is applied.

In the alternative construction illustrated in Figure 3 there is arranged within the cylinder G of a sleeve valve internal combustion engine a plug-like cylinder head H between the outer circumferential wall of which and the inner circumferential wall of the cylinder G is an annular space in which is located and can move the upper end of a sleeve valve J provided with ports $J^1$ and controlling inlet and exhaust ports $G^1$ and $G^2$ in the cylinder G. A reciprocating piston $H^1$ is disposed within the sleeve valve J.

Formed in the outer circumferential wall of the plug-like cylinder head H is a sealing ring groove K within which is mounted a sealing ring L of the known split type having the usual small clearance in a direction parallel to the cylinder axis to permit of free radial movement of the ring relatively to the cylinder head, but to prevent excessive flow of gas behind the ring. The radial depth of the groove K is such in relation to the radial thickness of the sealing ring L therein that, as shown, there is an annular recess M behind the ring L. In this recess M is disposed an axially movable member N which may be formed as a series of segments similar to the segments F shown in Figures 1 and 2 or may be a single split ring. As shown the member N is of such dimensions measured radially as substantially to fill the annular space M but has such width measured in a direction parallel to the cylinder axis as to permit thereto a limited movement in the annular recess M in such axial direction under the action of the gas flowing into and out of the sealing ring groove during operation of the engine.

It is to be understood that the constructions more particularly described above with reference to the accompanying drawings are given by way of example only and that the form and dimensions of the axially movable member or members as well as the dimensions of the annular recess behind the sealing ring and other details of construction may be varied without departing from this invention. Further, the invention may be applied to one or more sealing ring grooves in a plug-like cylinder head employed in a poppet valve or other reciprocating engine, pump or compressor which head is axially movable for the purpose of varying the compression ratio or the effective swept volume of the cylinder, and in other cases where one or more sealing rings are provided between two relatively movable parts to reduce or prevent the escape of working fluid from the cylinder of a reciprocating engine.

What I claim as my invention and desire to secure by Letters Patent is:—

1. A fluid pressure engine of the reciprocating piston type including in combination two concentric relatively movable cylindrical parts the joint between which is subject to the pressure in the working chamber of the engine, a sealing ring disposed in a groove in one of these parts and bearing on the other part, the radial width of the groove in relation to the radial thickness of the sealing ring being such as to leave behind the sealing ring an annular recess, and at least one member disposed in this recess and having appreciably less width than the sealing ring groove measured in a direction at right angles to the plane in which the sealing ring lies so that such member can have limited movement in such direction.

2. A fluid pressure engine of the reciprocating piston type including in combination two concentric relatively movable cylindrical parts the joint between which is subject to the pressure in the working chamber of the engine, a sealing ring disposed in a groove in one of these parts and bearing on the other part, the radial width of the groove in relation to the radial thickness of the sealing ring being such as to leave behind the sealing ring an annular recess, and an annular member disposed in this recess and having appreciably less width than the sealing ring groove measured in a direction at right angles to the plane in which the sealing ring lies so that the annular member can have limited movement in such direction.

3. A fluid pressure engine of the reciprocating piston type including in combination two concentric relatively movable cylindrical parts the joint between which is subject to the pressure in the working chamber of the engine, a sealing ring disposed in a groove in one of these parts and bearing on the other part, the radial width of the groove in relation to the radial thickness of the sealing ring being such as to leave behind the sealing ring an annular recess, and an annular member disposed in this recess and constituted by a series of separate segmental members each of which has appreciably less width than the sealing ring groove measured in a direction at right angles to the plane in which the sealing ring lies so that the segmental members can have limited movement in such direction.

4. A fluid pressure engine of the reciprocating piston type including in combination two concentric relatively movable cylindrical parts the joint between which is subject to the pressure in the working chamber of the engine, a sealing ring disposed in a groove in one of these parts and bearing on the other part, the radial width of the groove in relation to the radial width of the sealing ring being such as to leave behind the sealing ring an annular recess, and an annular member disposed in this recess having appreciably less width than the sealing ring groove measured in a direction at right angles to the plane in which the sealing ring lies and a radial thickness approximately the same as the radial dimension of the recess.

5. A fluid pressure engine of the reciprocating piston type including in combination two concentric relatively movable cylindrical parts the joint between which is subject to the pressure in the working chamber of the engine, a sealing ring disposed in a groove in one of these parts and bearing on the other part, the radial width of the groove in relation to the radial thickness of the sealing ring being such as to leave behind the sealing ring an annular recess, and an annular member disposed in this recess and constituted by a series of separate segmental members each of which has appreciably less thickness than the sealing ring groove measured in a direction at right angles to the plane in which the sealing ring lies and a radial thickness approximately the same as the radial dimension of the annular recess so that the segmental members cannot have appreciable radial movement but have a limited movement in the recess in a direction at right angles to the plane in which the sealing ring lies.

In testimony whereof I have signed my name to this specification.

HARRY RALPH RICARDO.